Aug. 7, 1928.
B. O. JESSEN
1,679,359
ORCHARD HEATER
Filed June 29, 1926
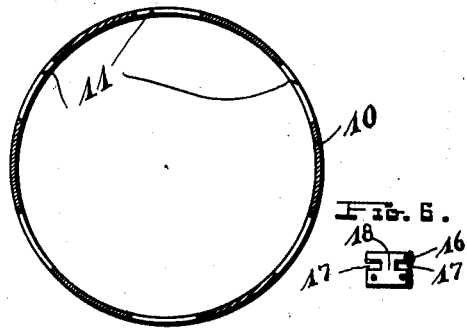
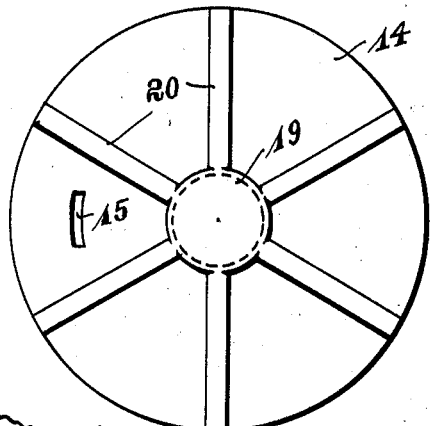
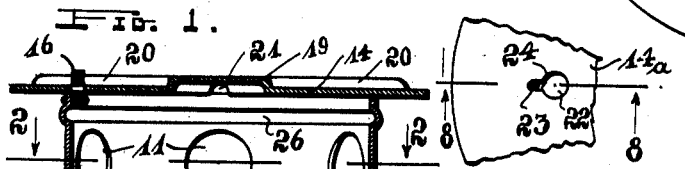
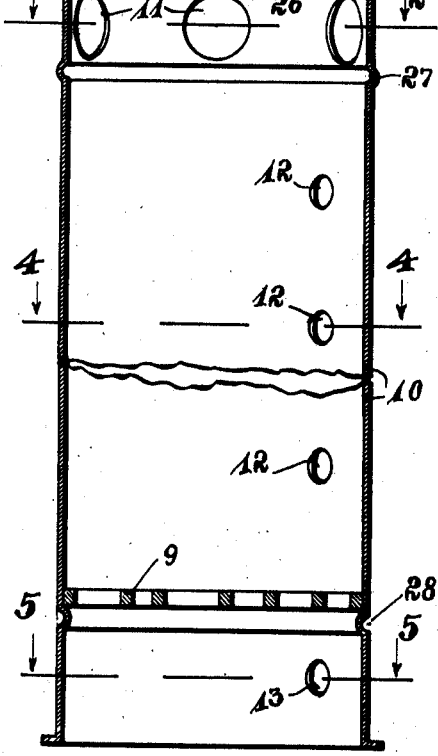
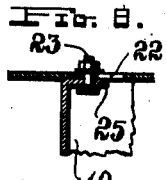
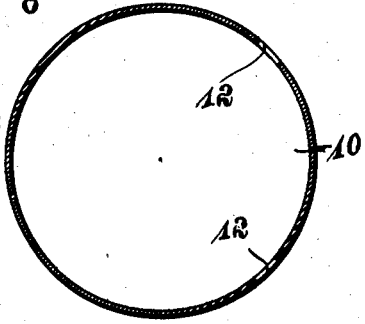
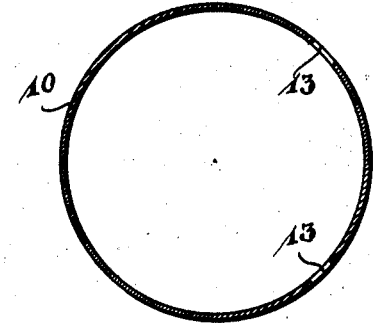
INVENTOR.
Bernard O. Jessen Patented Aug. 7, 1928.

1,679,359

UNITED STATES PATENT OFFICE.

BERNARD O. JESSEN, OF LOS ANGELES, CALIFORNIA.

ORCHARD HEATER.

Application filed June 29, 1926. Serial No. 119,373.

This invention relates to devices used in protecting orchards against frost.

One of the objects of this invention is to provide a device of a simple construction in which solid fuel, such as briquettes, can be burned.

Another object is to provide a device with a removable top, to facilitate a refueling.

Another object is to provide a device by which the natural upward draft of the products of combustion is checked, and in which means are provided to deflect the products of combustion laterally in all directions in order to facilitate frost prevention over the largest area possible.

Another object is to provide a heater with air-supplying means in certain relation to the outlet for the products of combustion throughout the heater for promoting the combustion without undue smoking.

Other objects will appear from the following description and appended claims as well as from the accompanying drawing, in which—

Fig. 1 is a fragmentary vertical section through a simple heater with cover and air-control embodying principles of this invention.

Fig. 2 is a cross section on line 2—2 of Fig. 1, illustrating the ample proportions of the outlet for the products of combustion.

Fig. 3 is a top plan view of the cover-plate, illustrating the reinforcements of the cover-plate and the means for connecting this plate to the casing of the heater.

Fig. 4 is a cross section on line 4—4 of Fig. 1, illustrating the restricted conditions and peculiar relation of the air-inlet and supplying openings in the heater casing with reference to the outlet openings for the products of combustion.

Fig. 5 is a cross section on line 5—5 of Fig. 1, illustrating the peculiar and restricted conditions of the air supplying means below the grate.

Fig. 6 is a detail side elevation of the pivot on the heater by which the cover-plate is removably connected to the top end of the heater casing.

Fig. 7 is a fragmentary top plan view of the cover-plate with engaging means of a slightly modified form, by which the cover-plate can be connected to the casing by means of a round bolt.

Fig. 8 is a fragmentary vertical section through the pivot-connection of the slightly modified form illustrated in Fig. 7.

In protecting orchards against frost, it has become customary to spread smoke or a heat wave as completely as possible over the whole field or orchard. so as to practically cut off any outside influence through unfavorable weather conditions.

Though oil heaters, or so-called smudge-pots may serve well in some fields, especially in locations where the necessary fuel oil supply is close at hand, other orchard protecting means in which solid or other fuel aside from oil can be burned are very desirable.

In the form illustrated in the drawing, a grate 9 is provided on which any solid fuel, such as wood, coal, or briquettes can be burned. The standpipe or casing 10 is therefore formed and designed to provide the necessary draft for such solid fuel, as by the upper outlet perforations 11, and the lower inlet perforations 12 and 13. The perforations 13 serve to allow air to enter the casing below the grate 9, and the perforations 11 serve to allow the products of combustion to escape laterally in all directions from the upper part of the casing 10. Extra perforations 12 are designed and arranged to promote and facilitate a desired burning of the fuel as well as heating by the products of combustion.

Too much oxygen is liable to cause a rapid but poor combustion, at the very least a very undesirable heating as far as a heating of orchards is concerned.

On the other hand, inasmuch as an orchard heater is preferably supplied with fuel to last for a long period, if possible, for the whole night, an insufficient air-supply is liable to cause a very undesirable smoking, and eventually insufficient and ineffective heating.

The perforations 12 in particular have to be arranged and proportioned in a certain manner, to produce a desired result. If the perforations 12 were arranged on all sides and throughout the whole length of the casing 10, it stands to reason that any fuel placed on the grate 9 would be consumed quickly all around close to the casing and that the heat would escape quickly through the large perforations 11 as well as through the many perforations in the sides of such a heater, forced by the draft from the bottom of such a heater, and the centrally packed fuel material would nevertheless cause a smoking.

With the perforations 12 arranged in the manner set forth herewith, or along the principles disclosed herewith, fuel may be packed in a heater of this type from the grate up to the top end of the heater with the assurance of giving an even heat from the beginning to the complete consumption of the fuel in the heater. This may be explained by the simple fact that the upper perforations 12 serve at first to supply air sufficient to burn the fuel above these upper perforations, and, as the fuel is consumed to a lower level, the next lower perforations supply the necessary air, and so on until the fuel is consumed down to the grate, when the perforations 13 supply the necessary air through the grate, especially if it is observed that the smaller inlet perforations 12 and 13 are disposed to face the wind or breeze in an orchard. When so disposed, the small inlet openings 12 and 13 function exactly like the small air-supply openings in the lower door or below the grate in any common oven.

Two perforations have been indicated in the different levels in the casing 10, though more or less can be provided, as long as they are properly proportioned, and as long as they are not in opposite sides, which obviously will result in a burning of the fuel in layers, and tend to cause a smoking through less well burning fuel in some of the layers, and which will also result in a less efficient heating, as explained above; while the arranging and proportioning of the air supply perforations 12 and 13 as described results in an even and a well regulated heating throughout the consumption of the fuel in the heater.

To further facilitate a proper heating and burning, and checking of the heating and burning, a cover-plate 14 is provided, which preferably remains disposed over the top end of the heater throughout the consumption of the fuel, to force the products of combustion to escape through the side openings 11 instead of straight through the top end of the heater.

This cover-plate 14 is preferably connected to the casing 10 of the heater in a removable manner and pivotally, to allow a refueling without requiring a removing of the cover-plate, though the cover-plate may be removed if so desired.

In Figs. 1, 3, 6 and 7, a simple form of pivot engagement is illustrated. The cover-plate is provided with a slot 15, to slip over the flat head 16 of the pivot. The pivot is provided with cuts or notches 17 of a width somewhat larger than the thickness of the cover-plate, and leaving a central portion 18, to allow a swinging of the cover-plate 14 around this central portion 18, the width of the slot 15 in the cover-plate being large enough to allow such a swinging of the cover-plate around the central portion 18 of the pivot.

The cover-plate is furthermore provided with a central impression 19 and rib-like impressions 20, forming reinforcements for the cover-plate, and also forming restricted escape for the products of combustion as indicated at 21, thereby bringing the products of combustion close to the cover-plate so as to radiate heat in an upward direction to a limited extent, while the major heat radiation is accomplished in a sidewise direction from all sides of the casing 10.

A slightly modified form of pivot engagement is illustrated in Figs. 7 and 8. The cover-plate $14_a$ is provided with a perforation 22 large enough to pass over the head of the pivot 23, while the comparatively narrow extension 24 merely fits around the stem or shaft of the pivot. The lug 25 on the casing $10_a$ serves to support the pivot 23. In this form too, the cover-plate may be swung around the pivot as well as entirely removed from the top of the casing.

The bead-like impressions 26, 27, and 28 in the casing 10 serve to maintain the shape of the casing, especially to reinforce the casing near the comparatively large outlet opening 11 and near the grate 9.

Having thus described my invention, I claim:

1. In an orchard heater, a casing having outlet openings for the products of combustion and having comparatively small inlet openings for air supply as near as practical along one side of the casing and below the first-named openings.

2. In an orchard heater, a casing having outlet openings towards all lateral sides for the products of combustion and having inlet openings for air supply at points below the first-named openings and along one side of the casing only.

3. In an orchard heater, a casing, a grate disposed in the casing to support solid fuel such as wood and coal, the casing having outlet openings for the products of combustion near the top edge of the casing and having other openings for air supply below the first-named openings and below as well as above said grate above one another on one side of the casing, and a cover-plate to close the top end of the casing.

In testimony that I claim the foregoing as my invention I have signed my name.

BERNARD O. JESSEN.